United States Patent [19]
Hammer et al.

[11] Patent Number: 6,021,251
[45] Date of Patent: Feb. 1, 2000

[54] COMPENSATED FIELD CURRENT CONTROL FOR A SEPARATELY EXCITED DC MOTOR

[75] Inventors: Joseph K. Hammer, St. Marys; David B. Stang, Troy; John R. Harman, Versailles; Christopher M. Killian, New Bremen, all of Ohio; Robert Lankin, Newton, Canada

[73] Assignee: Crown Equipment Corporation, New Bremen, Ohio

[21] Appl. No.: 09/162,270

[22] Filed: Sep. 29, 1998

Related U.S. Application Data

[63] Continuation-in-part of application No. 08/889,227, Jul. 8, 1997, Pat. No. 5,878,189.
[60] Provisional application No. 60/060,430, Sep. 30, 1997, and provisional application No. 60/060,460, Sep. 30, 1997.

[51] Int. Cl.[7] .................................................. H02P 5/178
[52] U.S. Cl. ..................... 388/801; 388/907.5; 318/432
[58] Field of Search ...................................... 318/244, 245, 318/432, 433; 388/801, 907.2, 907.5

[56] References Cited

U.S. PATENT DOCUMENTS

| | | |
|---|---|---|
| 4,079,301 | 3/1978 | Johnson, III . |
| 4,206,389 | 6/1980 | Snyder .................................... 388/806 |
| 4,284,932 | 8/1981 | Kawada et al. ......................... 388/804 |
| 4,408,147 | 10/1983 | Gabel ...................................... 318/493 |
| 4,422,022 | 12/1983 | Hill et al. . |

(List continued on next page.)

FOREIGN PATENT DOCUMENTS

| | | |
|---|---|---|
| 6-311775 | 11/1994 | Japan . |
| WO 91/15379 | 10/1991 | WIPO . |
| WO 93/19949 | 10/1993 | WIPO . |
| WO 93/20611 | 10/1993 | WIPO . |

OTHER PUBLICATIONS

Park et al, "Microprocessor–Based Optimal–Efficiency Drive of an Induction Motor" IEEE Transactions on Industrial Electronics, vol. 1E–31, No. 1, Feb. 1984, pp. 69–73.

Hong et al., "Microprocessor–Based High–Efficiency Drive of a DC Motor" IEEE Transactions on Industrial Electronics, vol. 1E–34, No. 4, Nov. 1987, pp. 433–440.

(List continued on next page.)

*Primary Examiner*—Bentsu Ro
*Attorney, Agent, or Firm*—Killworth, Gottman, Hagan & Schaeff, L.L.P.

[57] ABSTRACT

In accordance with one embodiment of the present invention, a motor control system is provided comprising an electrical motor, a motor speed sensor, a speed command generator, an armature voltage sensor, and a microprocessor. The electrical motor includes an armature assembly and a field assembly. The armature assembly is responsive to an armature current, the magnitude of which is a function of a predetermined armature current setpoint. The field assembly is responsive to a field current, the magnitude of which is a function of a predetermined field current setpoint and a field current correction signal. The motor speed sensor is arranged to generate an actual motor speed signal representative of an actual speed of the electrical motor. The speed command generator is arranged to generate a speed command signal indicative of a desired speed of the electrical motor. The armature voltage sensor is arranged to generate a measured armature voltage signal from an electrical potential of the armature assembly. The microprocessor is programmed to: (i) generate an armature voltage reference signal, the field current setpoint, and the armature current setpoint, wherein the armature voltage reference signal, the field current setpoint, and the armature current setpoint as a function of the speed command signal and the actual motor speed signal; (ii) compare the armature voltage reference signal to the measured armature voltage signal and generate an armature voltage error signal based on the comparison; and, (iii) generate the field current correction signal as a function of the armature voltage error signal.

16 Claims, 4 Drawing Sheets

U.S. PATENT DOCUMENTS

| | | | |
|---|---|---|---|
| 4,520,299 | 5/1985 | Konrad | 318/587 |
| 5,039,924 | 8/1991 | Avitan | 318/139 |
| 5,070,283 | 12/1991 | Avitan | 318/139 |
| 5,264,763 | 11/1993 | Avitan | 318/139 |
| 5,349,279 | 9/1994 | Avitan | 318/803 |
| 5,453,672 | 9/1995 | Avitan | 318/493 |
| 5,585,706 | 12/1996 | Avitan | 318/493 |
| 5,642,023 | 6/1997 | Journey | 318/493 |
| 5,793,175 | 8/1998 | Journey . | |

OTHER PUBLICATIONS

Park et al., "Microprocessing–Based High Efficiency Drive of a DC Series Motor" IECON '84, pp. 455–459.

N. Mohan, "Improvement in Energy Efficiency of Induction Motors by Means of Voltage Control" IEEE Transactions on Power Apparatus and Systems, vol. PAS–99, No. 4 Jul./Aug. 1980, pp. 1466–1471.

Avitan et al., "Mathematical Modeling and Computer Simulation of a Separately Excited dc Motor with Independent Armature/Field Control" IEEE Transactions on Industrial Electronics, vol. 37, No. 6 Dec. 1990, pp. 483–489.

M. H. Rashid, "Automatic armature and field control of d.c. series motors" IEEE Proc., vol. 128, Pt. B, No. 1, Jan. 1981, pp. 73–78.

Funabiki et al., "Current commands for high–efficiency torque control of DC shunt motor" IEE Proceedings–B, vol. 138, No. 5, Sep. 1991, pp. 227–232.

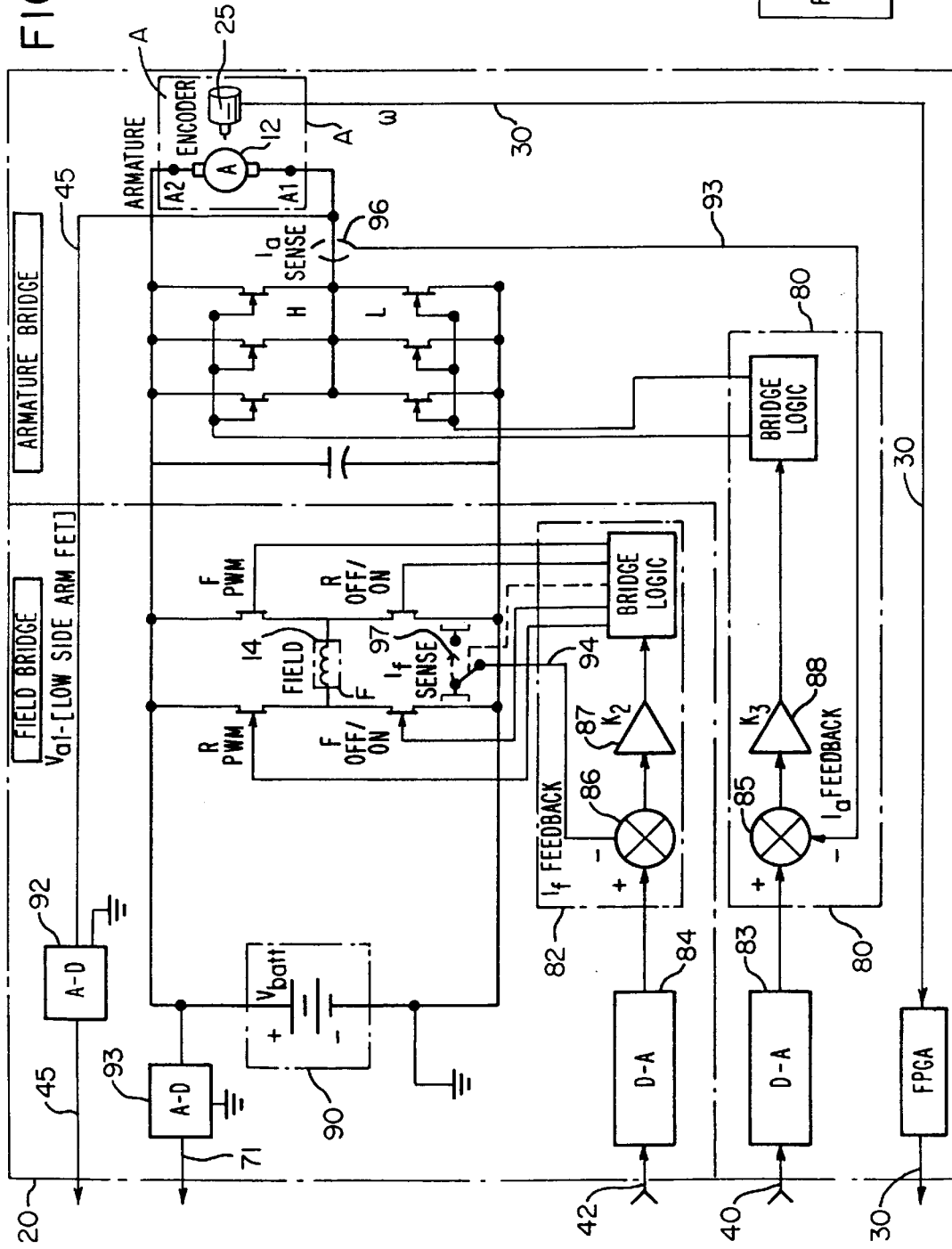

COMPENSATED FIELD CURRENT CONTROL FOR A SEPARATELY EXCITED DC MOTOR

CROSS REFERENCE TO RELATED APPLICATIONS

This application claims the benefit of the following U.S. Provisional Applications: Ser. No. 60/060,430 for SEPARATELY EXCITED DC MOTOR CONTROL CIRCUIT, filed Sep. 30, 1997; and Ser. No. 60/060,460 for FIELD DE-BOOST FOR SEPARATELY EXCITED DC MOTOR, filed Sep. 30, 1997. This application is a Continuation-in-Part of U.S. patent application Ser. No. 08/889,227 for CONTROL SYSTEM FOR SEPARATELY EXCITED DC MOTOR, filed Jul. 8, 1997, now U.S. Pat. No. 5,878,189.

BACKGROUND OF THE INVENTION

The present invention relates to control of separately excited DC motors and, more particularly, to a control scheme for a separately excited DC motor wherein a field current signal is compensated to increase the operating efficiency of the DC motor.

One problem with microprocessor control of separately excited motors results from the fact that the field flux expected from a given field current, as derived from the motor equations employed, is not always as expected. Specifically, actual field flux will differ from a given value, primarily as a result of magnetic hysteresis in the field poles. This variation in field flux is also attributable to motor-to-motor variations arising from manufacturing tolerances. Thus, while theory may predict optimal motor performance under given torque and speed conditions, in reality, the resulting operating efficiency is often less than expected or desired. Accordingly, there is a need for a motor control scheme for a separately excited DC motor that accounts for the difference between the expected field flux and the actual field flux to improve the operating efficiency of the motor.

SUMMARY OF THE INVENTION

This need is met by the present invention wherein a motor control system is provided including a microprocessor programmed to generate an armature voltage reference signal and a field current setpoint, compare the armature voltage reference signal to a measured armature voltage signal, generate an armature voltage error signal based on the comparison, and generate a field current correction signal as a function of said armature voltage error signal.

In a preferred embodiment of a motor control scheme according to the present invention, optimal field current and armature current setpoints are established in accordance with tabulated values selected for providing a required torque and speed. A table of corresponding armature voltage values is also maintained. Flux losses in the motor are detected indirectly by measuring the motor's armature voltage. Specifically, a reduction of back EMF acting on the armature indicates a flux decrease. A voltage sensor sends measured values of armature voltage to an armature voltage comparator for comparison with expected values thereof as read out from the above-mentioned table. The differences are used for adjusting the field current setpoint and thereby adjusting the flux.

More specifically, the controller of this invention compensates for flux losses by using a table of armature voltage values to determine an armature voltage reference point. An armature voltage sensor measures the actual average armature voltage and sends the measured value back to a microprocessor. The microprocessor compares the measured armature voltage with the armature voltage reference point and multiplies the difference by a variable gain factor to obtain a correction term. The correction term then is added to the field current setpoint in order to adjust flux as required.

The look-up tables of the present invention, described in further detail herein, output field and armature current values that are optimized to minimize component heating by minimizing armature current. The tables are generated based on empirical fit functions to dynamometer data on a limited sampling of a particular motor configuration. Since the tables are constructed based on a defined model, component tolerances, wear, heating, and state of battery charge can contribute to sample-to-sample variances in resultant output horsepower or energy conversion. Further, since the tables are built using a nominal battery voltage at 90% state of charge, any level below this will not only lower armature voltage but will also lower armature current, resulting in a reduction in peak torques and a corresponding premature loss in vehicle acceleration. Peak torque reduction can be lessened by holding armature currents to their desired level.

In accordance with one embodiment of the present invention, a motor control system is provided comprising an electrical motor, a motor speed sensor, a speed command generator, an armature voltage sensor, and a microprocessor. The electrical motor includes an armature assembly and a field assembly. The armature assembly is responsive to an armature current, the magnitude of which is a function of a predetermined armature current setpoint. The field assembly is responsive to a field current, the magnitude of which is a function of a predetermined field current setpoint and a field current correction signal. The motor speed sensor is arranged to generate an actual motor speed signal representative of an actual speed of the electrical motor. The speed command generator is arranged to generate a speed command signal indicative of a desired speed of the electrical motor. The armature voltage sensor is arranged to generate a measured armature voltage signal from an electrical potential of the armature assembly. The microprocessor is programmed to: (i) generate an armature voltage reference signal, the field current setpoint, and the armature current setpoint, wherein the armature voltage reference signal, the field current setpoint, and the armature current setpoint as a function of the speed command signal and the actual motor speed signal; (ii) compare the armature voltage reference signal to the measured armature voltage signal and generate an armature voltage error signal based on the comparison; and, (iii) generate the field current correction signal as a function of the armature voltage error signal.

The microprocessor may further be programmed to generate the field current correction signal such that it is inversely proportional to the actual motor speed signal. The microprocessor may also be programmed to generate the field current correction signal as a function of the armature voltage error signal and the actual motor speed signal. Further, the microprocessor may be programmed to generate the field current correction signal in response to the armature voltage error signal and the actual motor speed signal or to generate the field current correction signal $I_{f\_correction}$ according to the following equation:

$$I_{f\_CORRECTION} = V_{\alpha\_ERROR} \times C_1 \times (G_v/\omega)$$

where $V_{\alpha\_ERROR}$ is the armature voltage error signal, $C_1$ is a constant, $G_v$ is a variable gain parameter, and $\omega$ is the actual speed of the motor. The constant $C_1$ preferably includes a motor constant K, unit scaling corrections, and a coefficient for $dI_{f\_SET}/dB'$ where $I_{f\_SET}$ is the field current setpoint and B represents the magnetic flux in the air gap of the electrical motor.

Where the armature assembly includes high and low voltage nodes, the armature voltage sensor is preferably arranged to measure armature voltage at the low voltage node. Where the electrical motor is driven by a battery voltage characterized by a battery voltage signal, the microprocessor may be programmed to modify the measured armature voltage signal by summing the measured armature voltage signal and the battery voltage signal prior to comparing the measured armature voltage signal to the armature voltage reference signal.

The microprocessor may be programmed to generate the armature voltage reference signal, the field current setpoint, and the armature current setpoint from a look-up table. According to one embodiment of the present invention, the look-up table is a dual-input look-up table, wherein a first input of the look-up table comprises a torque setpoint signal, and wherein a second input of the look-up table comprises the actual motor speed signal. The microprocessor may be programmed to generate the torque setpoint signal as a function of the speed command signal and the actual motor speed signal. Additionally, the microprocessor may be programmed to generate the armature voltage reference signal, the field current setpoint, and the armature current setpoint from a look-up table having at least one input value derived from the speed command signal and the actual motor speed signal.

In accordance with another embodiment of the present invention, a motor control circuit is provided comprising a motor speed sensor, a speed command generator, an armature voltage sensor, and a microprocessor programmed to: (i) generate an armature voltage reference signal, a field current setpoint, and an armature current setpoint, wherein the armature voltage reference signal, the field current setpoint, and the armature current setpoint are generated as a function of the speed command signal and the actual motor speed signal; (ii) compare the armature voltage reference signal to the measured armature voltage signal and generate an armature voltage error signal based on the comparison; and, (iii) generate a field current correction signal as a function of the armature voltage error signal.

In accordance with yet another embodiment of the present invention, a motor control system is provided comprising an electrical motor, a motor speed sensor, an armature voltage sensor, and a microprocessor programmed to: (i) generate an armature voltage reference signal and the field current setpoint; (ii) compare the armature voltage reference signal to the measured armature voltage signal and generate an armature voltage error signal based on the comparison; and, (iii) generate the field current correction signal as a function of the armature voltage error signal.

In accordance with yet another embodiment of the present invention, a motor control circuit is provided comprising a motor speed sensor, an armature voltage sensor, and a microprocessor programmed to: (i) generate an armature voltage reference signal and a field current setpoint; (ii) compare the armature voltage reference signal to the measured armature voltage signal and generate an armature voltage error signal based on the comparison; and (iii) generate a field current correction signal as a function of the armature voltage error signal.

In accordance with yet another embodiment of the present invention, a motor control system is provided comprising an electrical motor, a motor speed sensor, a speed command generator, an armature voltage sensor, and a microprocessor. The electrical motor is driven by a battery voltage characterized by a battery voltage signal, and includes an armature assembly including high and low voltage nodes and a field assembly. The armature assembly is responsive to an armature current, wherein a magnitude of the armature current is a function of a predetermined armature current setpoint. The field assembly is responsive to a field current, wherein a magnitude of the field current is a function of a predetermined field current setpoint and a field current correction signal. The motor speed sensor is arranged to generate an actual motor speed signal representative of an actual speed of the electrical motor. The speed command generator is arranged to generate a speed command signal indicative of a desired speed of the electrical motor. The armature voltage sensor is arranged to generate a measured armature voltage signal from an electrical potential of the armature assembly at the low voltage node. The microprocessor is programmed to: (i) generate an armature voltage reference signal, the field current setpoint, and the armature current setpoint from a dual-input look-up table, wherein a first input of the look-up table comprises a torque setpoint signal, wherein a second input of the look-up table comprises the actual motor speed signal, and wherein the microprocessor is programmed to generate the torque setpoint signal as a function of the speed command signal and the actual motor speed signal; (ii) compare the armature voltage reference signal to the measured armature voltage signal and generate an armature voltage error signal based on the comparison; (ii) modify the measured armature voltage signal by summing the measured armature voltage signal and the battery voltage signal prior to comparing the measured armature voltage signal to the armature voltage reference signal; and, (iii) generate the field current correction signal $I_{f\_correction}$ according to the following equation:

$$I_{f\_CORRECTION} = V_{a\_ERROR} \times C_1 \times (G_v/\omega)$$

Accordingly, it is an object of the present invention to provide a motor control scheme for a separately excited DC motor that accounts for the difference between the expected field flux and the actual field flux to improve the operating efficiency of the motor. Other objects of the present invention will be apparent in light of the description of the invention embodied herein.

BRIEF DESCRIPTION OF THE DRAWINGS

The following detailed description of the present invention can be best understood when read in conjunction with the following drawings, where like structure is indicated with like reference numerals and in which:

FIGS. 2 and 3 are complementary portions of a detailed schematic block diagram illustrating a motor control system of the present invention;

FIG. 4 illustrates the manner in which FIGS. 2 and 3 are combined to form a complete detailed schematic block diagram illustrating the motor control system of the present invention.

DETAILED DESCRIPTION OF THE INVENTION

Figure 1:
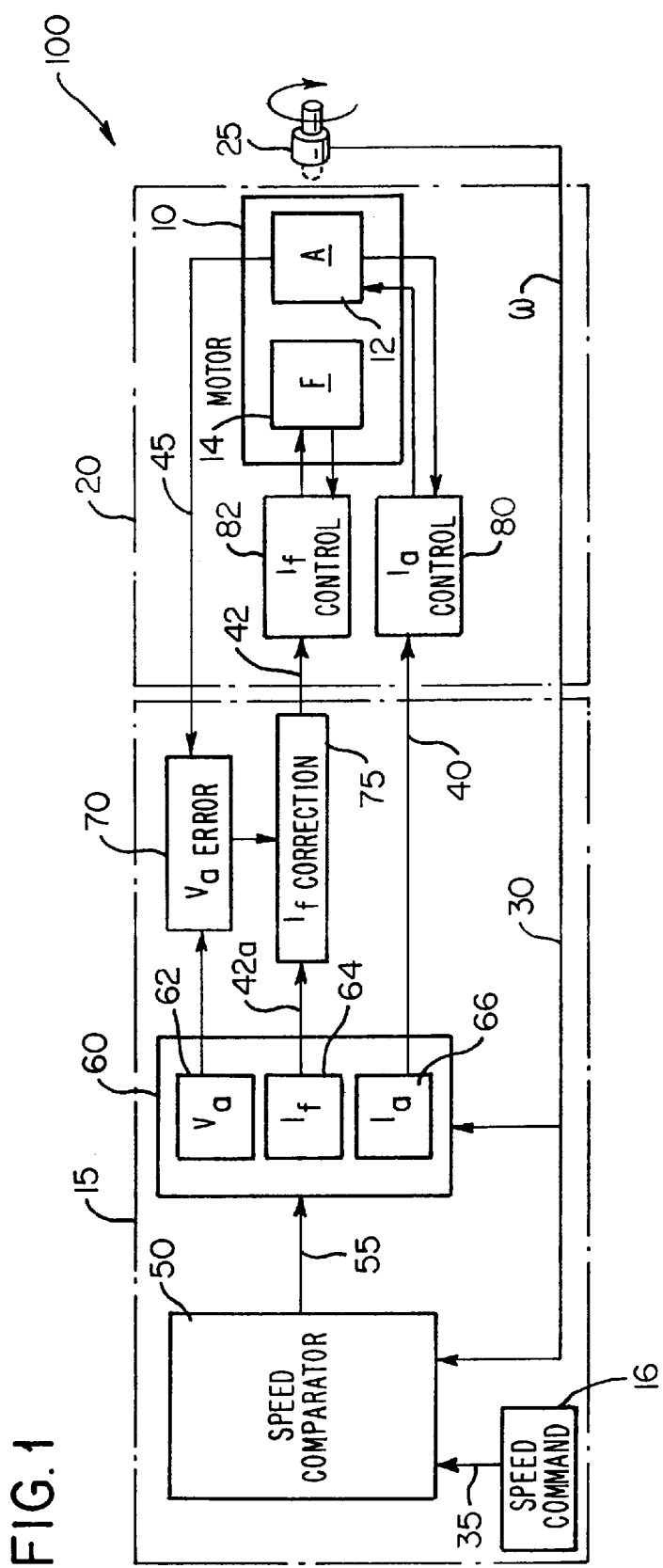
FIG. 1 is a schematic block diagram illustrating a motor control system of the present invention.

Referring now to FIGS. 1–4, a motor control system 100 according to the present invention is illustrated in detail. The motor control system 100 comprises an electrical motor 10 including an armature assembly 12 and a field assembly 14, a speed command generator 16, an armature voltage sensor (see line 45), a microprocessor 15, and a motor control circuit 20. A speed sensor 25, e.g., an encoder or tachometer, provides an output on a line 30 representing the actual speed ω (rad/sec) of the motor 10.

Shown within the microprocessor 15 are several blocks that represent functions performed by the microprocessor 15 and the associated hardware. The blocks or routines of particular interest include a speed comparator function 50, a set of two-way look up tables 60, an armature voltage error function 70 and a field current correction function 75.

The speed comparator function 50 compares a speed command signal on a line 35 to the actual motor speed signal on the line 30 and in response thereto provides a torque command signal on an line 55 to the look up tables 60. Specifically, referring to FIGS. 2 and 3, which figures represent respective portions of the entire motor control system 100 and which figures are interconnected to one another as shown in FIG. 4, the speed command signal s on the line 35 and the actual speed signal ω on the line 30 are applied to the speed comparator function 50 in the microprocessor 15. More specifically, the signals s and ω are inputs to a comparator 51, the output of which is applied to an amplifier function or amplifier 52 which has a gain Kp set to command a torque high enough for rapid response to a speed error but low enough to avoid stability problems. Thus, the output of amplifier 52 is Tp=Kp(s−ω).

Proportional plus integral control (PIC) is achieved by integrating the speed error and adding the result to the output of the amplifier 52. This is done by an amplifier function or amplifier 53, which integrates the output of the comparator 51. Thus, its output is Ti=Ki∫(s−ω)dt. The outputs of the amplifiers 52 and 53 are added by function 54, giving the torque setpoint signal T=Ti+Tp on the line 55. The gain of Kp of the amplifier function 52 and the gain Ki of the amplifier function or amplifier 53 are conditionally proportional to the motor speed signal on the line 30. At low motor speed, the gain is higher than at higher speeds. This provides stability and the necessary torque for hill holding. The amplifier 52 provides the initial response to a new speed command. The response from the integrator amplifier 53 builds up slowly and predominates as the speed error is driven to zero. The steady state output from the integrator amplifier 53 produces torque setpoint values appropriate for handling a steady state load with no error signal from the speed comparator 51.

Referring now to the look up tables 60, table 62 contains a matrix of expected armature voltage values $V_\alpha$, table 64 contains a matrix of field current values $I_f$, and table 66 contains a matrix of armature current values $I_\alpha$. Field current and armature current setpoints are produced by the look-up tables 64 and 66, based upon the actual speed signal ω and the torque command or torque setpoint signal on the line 55, and are applied to the motor control circuit 20. The field current setpoint is adjusted by the field current correction function 75, as will be explained in detail below.

It is contemplated by the present invention that, although the embodiment described herein, where the torque setpoint signal and the actual speed signal ω are used as inputs to a look up table to determine the field current and armature current setpoints and the expected armature voltage values, others schemes may be employed to determine the setpoints and expected values without departing from the scope of the present invention. This is particularly the case for embodiments of the present invention where the determination of these values is not the critical aspect of the particular embodiment.

A voltage signal on the line 45 from the armature assembly 12, from which flux level is derived, is fed back to the armature voltage error function 70 of the microprocessor 15. The field current correction function 75 adjusts the field current setpoint in accordance with the signal output from the armature voltage error function 70. Specifically, if the armature voltage on the line 45 is not what is expected, based on the torque command signal on the line 55 and the actual speed of the motor represented on the line 30, then the field current signal on a line 42 is adjusted accordingly. The reason armature voltage will not be as expected is due primarily to hysteresis in the flux characteristics in the motor field poles, and also to motor-to-motor manufacturing tolerances. The armature voltage values $V_\alpha$ in table 62 are calculated based on the expected flux. The expected flux is determined as a function of the nominal flux characteristics of the particular motor. The actual flux of the motor will be somewhat different from the expected flux, due primarily to hysteresis. The motor control scheme of the present invention accounts for this difference in flux by adjusting the field current.

The armature voltage error function 70 includes a comparator function 72 that receives a signal representing battery voltage on a line 71 and a signal representing the voltage $V_{\alpha 1}$ from the low voltage side of the armature bridge on the line 45. Both lines 45 and 71 include analog to digital, or A–D, converter circuits, 92 and 93, see FIG. 3. The output $V_\alpha'$ of the comparator function 72 is compared with the output $V_{\alpha\text{-}REFERENCE}$ from the look-up table 62. If the voltage output signal $V_\alpha'$ of the comparator 72 is less than what is called for by the look-up table 62, then an output signal $V_{\alpha\text{-}ERROR}$ is generated and applied to an amplifier 74. The amplifier 74 also receives the motor speed signal ω. The output of the amplifier 74 is added to the $I_f$ setpoint signal on a line 41 in adder function 76 to produce an adjusted $I_f$ setpoint on a line 42.

Regarding the operation of the amplifier 74, it is initially noted that the back EMF E of a motor is defined as $$E = K \times B \times \omega$$

where K is a motor design constant, B is the magnetic flux in the air gap of the motor (the gap between the poles of the field assembly 14 and the core of the armature assembly 12), and ω is the rotational speed of the armature assembly 12. Differentiating the equation with respect to $I_f$ yields $$dE = K \times dB/dI_f \times \omega \times dI_f$$

Rearranging the equation for $dI_f$ yields $$dI_f = (dE/\omega) \times (dI_f/dB/K)$$

In practice, this equation is implemented in a field adjustment gain term $G_V$ in the following form:

$$I_{f\_CORRECTION} = V_{\alpha\_ERROR} \times C_1 \times (G_V/\omega)$$

where $V_{\alpha\_ERROR}$ is the armature voltage error signal, $C_1$ is a constant, $G_V$ is a variable gain parameter, ω is the actual speed of the motor, and where the magnitude of the field current correction signal is inversely proportional to the actual motor speed signal ω. The constant $C_1$ preferably includes a motor constant K, unit scaling corrections, and a coefficient for $dI_{f\_SET}/dB$, where $I_{f\_SET}$ is the field current setpoint and B represents the magnetic flux in the air gap of the electrical motor. The motor constant K is computed as follows $$K = \frac{(N_C)(N_P)}{2\pi(N_A)}$$

where $N_C$ is the number of conductors in the armature assembly 12, $N_P$ is the number of poles in the armature assembly 12, and $N_A$ is the number of parallel armature current paths in the armature assembly 12. The value for $G_v$, the variable gain parameter, is selected to tune the amplifier 74 for optimum performance. It is noted that, although typical values for $G_v$ range from about 100 to about 500, the specific value for $G_v$ is subject to determination for each individual motor to be controlled by the motor control scheme of the present invention.

It is contemplated by the present invention that, in certain embodiments or applications of the present motor control scheme, it may be preferable to establish a threshold motor speed below which the armature voltage error function will be inactivated. Further, it is contemplated by the present invention that, in certain embodiments or applications of the present motor control scheme, it may be preferable to establish a maximum armature voltage setpoint threshold slightly below the actual value of the battery voltage, e.g., about 0.03 volts below the actual value of the battery voltage. Finally, it is contemplated by the present invention that, in certain embodiments or applications of the present motor control scheme, the field current will be adjusted only where: (i) the actual motor speed is greater than a minimum speed threshold corresponding to the adjusted field current setpoint; and (ii) the actual armature voltage is less than the armature voltage setpoint. Preferably, there are no limitations placed on the degree to which the field current may be increased by the armature voltage error function 70, with the exception, of course, that the field current and the armature voltage setpoint cannot exceed the physical limitations of the battery power source. Specifically, the maximum field current cannot be greater that the battery voltage divided by the field resistance and the armature voltage setpoint cannot be greater than the battery voltage.

Figure 5:
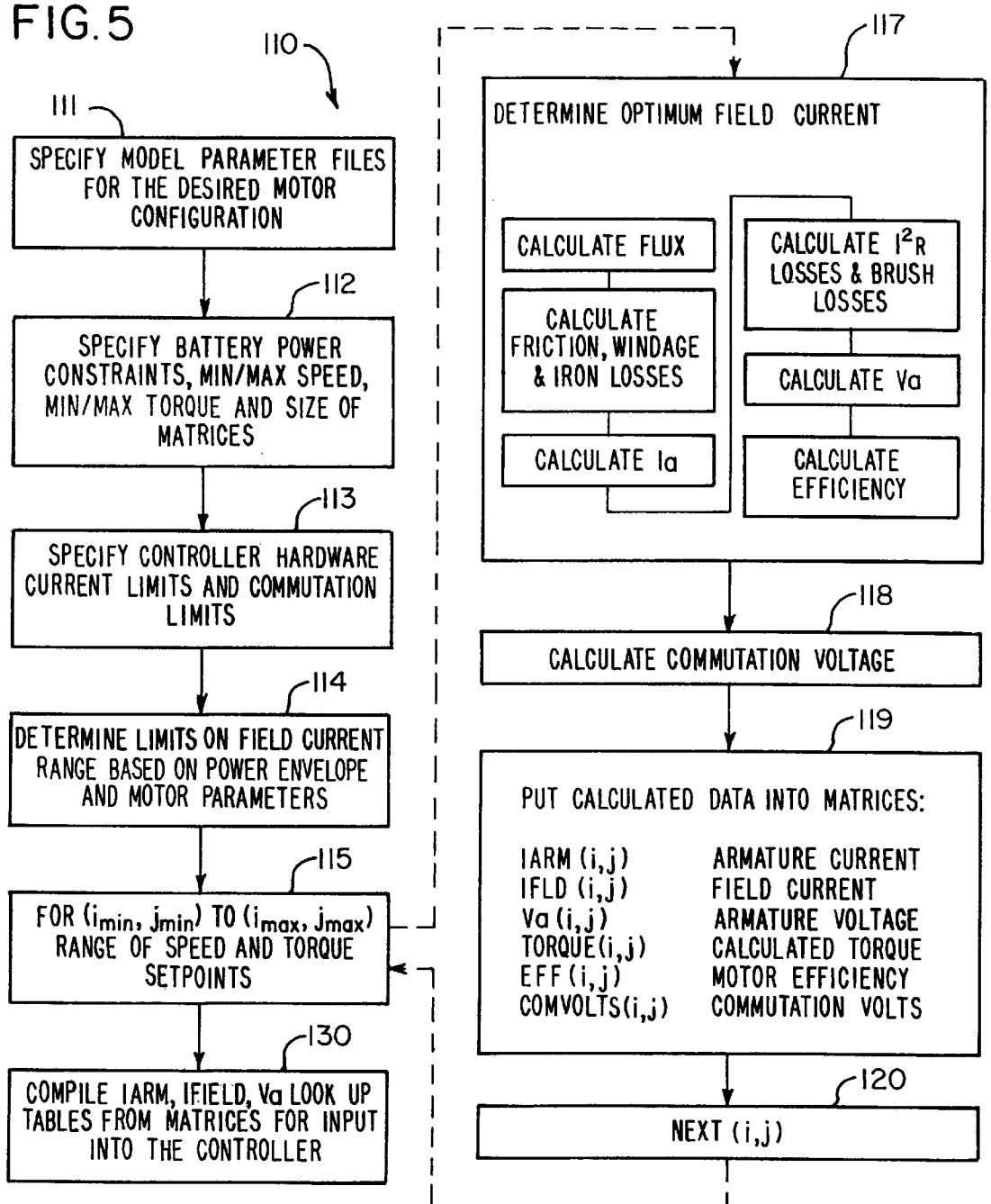
FIG. 5 is a flow chart illustrating the process by which values stored in look-up tables 60 are determined according to the present invention.

Referring now to FIG. 5, the process by which the values stored in the look-up tables 60 are determined is described in detail. It is contemplated by the present invention, however, that a number of different schemes could be employed to determine preferred values for armature current, field current, and armature voltage setpoints, including schemes that do not utilize any look-up tables. FIG. 5 represents a routine 110 for minimizing armature current. The first step, see block 111, is to specify model parameter files for the desired motor configuration. The second step, see block 112, is to specify battery power constraints, minimum and maximum speed, minimum and maximum torque and look-up table size. The next step, see block 113 is to specify controller hardware current limits and commutation limits. Next, see block 114, limits on field current range based on power envelope and motor parameters are determined.

In block 115, $i_{min}$, $j_{min}$ to $i_{max}$, $j_{max}$ are determined and represent a range of speed and torque setpoints. In block 117, the field excitation current which results in minimum armature current within a given range is determined. The tables are generated based on empirical fit functions to dynamometer data on a limited sampling of a particular motor configuration. Since the tables are constructed based on a defined model, component tolerances, wear, heating, and state of battery charge can contribute to sample-to-sample variances in resultant output horsepower or energy conversion. Commutation voltage is calculated in block 118 and this data is put into matrices, see block 119. The process is then repeated, see block 120 for each element (i, j) in the tables. Finally, the tables are compiled, see block 130, and stored. Thus, the following items are calculated and stored: armature current $I_{arm}$ (i,j); field current $I_{fld}$ (i,j); armature voltage $V_\alpha$ (i,j); calculated torque (i,j); motor efficiency (i,j); and, commutation voltage (i,j).

Table 1 is an example of a look-up table giving the desired armature current $I_a$ for various values of torque T setpoints (left vertical column) and actual speed (top row). Similarly, Table 2 is an example of a look-up table for desired field current $I_f$ at specified torques and speeds. Table 3 is an example of a look-up table that provides expected armature voltages $V_\alpha$ at those specified torques and speeds. Table 4 represents expected torque. The torque value T in newton-meters (Nm) is provided by the speed comparator function 50 of the microprocessor 15 and the actual speed value is provided by the encoder 25. Speed is given in radians/second. In the preferred embodiment of this invention, the torque values in each table are in 5 newton-meter increments and the speed ranges from 0 to 400 radians/second. The data in these specific tables are unique to a given motor configuration or design since they are generated with reference to such factors that include but are not limited to the size, torque, and speed of the motor and internal motor losses. Interpolation may be used to determine values of $I_v$, $I_\alpha$ and $V_\alpha$ for intermediate speed and torque values. It is important to note that, although the following look-up tables are presented in substantial detail, the information embodied therein could be gleaned, through interpolation and routine experimentation, from a significantly abbreviated reproduction of the tables.

TABLE 1

$I_{ARM}$

| T↓ | $\omega$ ← | | | | | | | | | | | | |
|---|---|---|---|---|---|---|---|---|---|---|---|---|---|
| | 0 | 16 | 32 | 48 | 64 | 80 | 96 | 112 | 128 | 144 | 160 | 176 | 192 |
| 80 | 560 | 560 | 560 | 560 | 560 | 560 | 560 | 560 | 560 | 560 | 560 | 516 | 438 |
| 75 | 560 | 560 | 560 | 560 | 560 | 560 | 560 | 560 | 560 | 560 | 560 | 516 | 438 |
| 70 | 530 | 533 | 537 | 540 | 542 | 543 | 544 | 545 | 546 | 547 | 549 | 516 | 438 |
| 65 | 493 | 496 | 500 | 503 | 504 | 505 | 507 | 508 | 509 | 510 | 511 | 516 | 438 |
| 60 | 456 | 459 | 462 | 466 | 467 | 468 | 469 | 470 | 471 | 473 | 474 | 484 | 438 |
| 55 | 418 | 422 | 425 | 428 | 430 | 431 | 432 | 433 | 434 | 435 | 436 | 437 | 438 |
| 50 | 381 | 384 | 388 | 391 | 393 | 394 | 395 | 396 | 397 | 398 | 399 | 400 | 413 |
| 45 | 344 | 347 | 350 | 354 | 355 | 356 | 357 | 359 | 360 | 361 | 362 | 363 | 364 |

TABLE 1-continued $I_{ARM}$

| | | | | | | | | | | | | | |
|---|---|---|---|---|---|---|---|---|---|---|---|---|---|
| 40 | 307 | 310 | 313 | 317 | 318 | 319 | 320 | 321 | 322 | 323 | 323 | 326 | 327 |
| 35 | 269 | 273 | 276 | 279 | 281 | 282 | 283 | 284 | 285 | 286 | 287 | 288 | 289 |
| 30 | 232 | 235 | 239 | 242 | 243 | 245 | 246 | 247 | 248 | 249 | 250 | 251 | 252 |
| 25 | 195 | 198 | 201 | 205 | 206 | 207 | 208 | 209 | 211 | 212 | 213 | 214 | 215 |
| 20 | 158 | 161 | 164 | 167 | 169 | 470 | 171 | 172 | 173 | 174 | 175 | 176 | 178 |
| 15 | 120 | 123 | 127 | 130 | 132 | 133 | 134 | 135 | 136 | 137 | 138 | 139 | 140 |
| 10 | 83 | 86 | 89 | 93 | 94 | 95 | 96 | 98 | 99 | 100 | 101 | 102 | 103 |
| 5 | 46 | 49 | 52 | 56 | 57 | 58 | 59 | 60 | 61 | 62 | 64 | 65 | 66 |
| 0 | 8 | 12 | 15 | 19 | 20 | 21 | 22 | 23 | 24 | 25 | 26 | 28 | 29 |
| −5 | 56 | 48 | 45 | −44 | −44 | −45 | −46 | −47 | −48 | −49 | −50 | −51 | −52 |
| −10 | 97 | 87 | 85 | −80 | −81 | −81 | −82 | −83 | −84 | −&5 | −86 | −87 | −88 |
| −15 | 136 | 126 | 124 | −117 | −116 | −116 | −117 | −117 | −118 | −118 | −119 | −121 | −122 |
| −20 | 174 | 164 | 162 | −151 | −151 | −151 | −150 | −149 | −152 | −152 | −153 | −153 |
| −25 | 210 | 200 | 198 | 195 | −179 | −178 | −181 | −180 | −181 | −181 | −182 | −183 | −184 |
| −30 | 244 | 234 | 232 | 230 | −211 | −210 | −209 | −208 | −209 | −208 | −209 | −209 | −208 |
| −35 | 277 | 266 | 263 | 259 | −245 | −244 | −242 | −241 | −240 | −240 | −240 | −240 | −239 |
| −40 | 309 | 298 | 295 | 293 | −280 | −279 | −278 | −277 | −276 | −275 | −274 | −273 | −273 |
| −45 | 343 | 333 | 330 | 327 | −317 | −316 | −315 | −314 | −314 | −313 | −312 | −310 | −309 |
| −50 | 379 | 369 | 365 | 362 | −354 | −353 | −352 | −351 | −350 | −349 | −347 | −346 | −345 |
| −55 | 414 | 403 | 400 | 397 | −391 | −390 | −389 | −388 | −387 | −386 | −385 | −384 | −383 |
| −60 | 451 | 441 | 438 | 434 | −428 | −427 | −426 | −425 | −424 | −423 | −422 | −421 | −420 |
| −65 | 487 | 476 | 473 | 469 | 468 | −464 | −463 | −462 | −461 | −460 | −459 | −458 | −457 |
| −70 | 524 | 513 | 510 | 507 | 505 | −502 | −501 | −500 | −498 | −497 | −496 | −495 | −494 |
| −75 | 560 | 551 | 547 | 544 | 543 | −539 | −538 | −537 | −536 | −535 | −534 | −533 | −531 |
| −80 | 560 | 560 | 560 | 560 | 560 | −560 | −560 | −560 | −560 | −560 | −560 | −560 | −532 |

$\omega \longrightarrow$

| $T\downarrow$ | 208 | 224 | 240 | 256 | 272 | 288 | 304 | 320 | 336 | 352 | 368 | 384 | 400 |
|---|---|---|---|---|---|---|---|---|---|---|---|---|---|
| 40 | 392 | 362 | 344 | 331 | 323 | 317 | 312 | 306 | 299 | 293 | | | |
| 37.5 | | 341 | 344 | 331 | 323 | 317 | 312 | 306 | 299 | 293 | | | |
| 35 | 392 | 313 | 341 | 331 | 323 | 317 | 312 | 306 | 299 | 293 | | | |
| 32.5 | | 287 | 309 | 331 | 323 | 317 | 312 | 306 | 299 | 293 | | | |
| 30 | 392 | 262 | 281 | 303 | 323 | 317 | 312 | 306 | 299 | 293 | | | |
| 27.5 | | 239 | 256 | 273 | 293 | 314 | 312 | 306 | 299 | 293 | | | |
| 25 | 392 | 217 | 232 | 245 | 262 | 280 | 299 | 306 | 299 | 293 | | | |
| 22.5 | | 198 | 207 | 219 | 233 | 248 | 263 | 280 | 297 | 293 | | | |
| 20 | 339 | 180 | 186 | 194 | 206 | 218 | 231 | 244 | 258 | 273 | 287 | 283 | 283 |
| 17.5 | | 161 | 164 | 171 | 180 | 190 | 200 | 211 | 223 | 235 | 247 | 260 | 274 |
| 15 | 253 | 142 | 143 | 149 | 156 | 163 | 171 | 190 | 189 | 199 | 209 | 219 | 229 |
| 12.5 | | 124 | 125 | 128 | 133 | 138 | 144 | 151 | 158 | 166 | 173 | 181 | 189 |
| 10 | 179 | 105 | 106 | 108 | 111 | 115 | 119 | 124 | 129 | 134 | 140 | 146 | 152 |
| 7.5 | | 96 | 87 | 89 | 91 | 92 | 96 | 98 | 102 | 106 | 109 | 113 | 118 |
| 5 | 104 | 67 | 68 | 69 | 70 | 71 | 72 | 74 | 78 | 78 | 90 | 93 | 85 |
| 2.5 | | 47 | 48 | 49 | 49 | 49 | 50 | 50 | 51 | 62 | 53 | 54 | 55 |
| 0 | 30 | 31 | 32 | 33 | 34 | 35 | 36 | 37 | 38 | 39 | 40 | 42 | 43 |
| −5 | −53 | −54 | −55 | −56 | −57 | −58 | −59 | −60 | −61 | −62 | −63 | −63 | −64 |
| −10 | −90 | −91 | −92 | −93 | −95 | −96 | −97 | −98 | −100 | −101 | −102 | −103 | −104 |
| −15 | −123 | −122 | −124 | −126 | −127 | −129 | −130 | −131 | −133 | −135 | −135 | −137 | −138 |
| −20 | −154 | −155 | −156 | −157 | −158 | −160 | −161 | −162 | −164 | −166 | −167 | −167 | −169 |
| −25 | −185 | −185 | −186 | −186 | −188 | −190 | −191 | −192 | −193 | −195 | −195 | −197 | −177 |
| −30 | −211 | −210 | −209 | −215 | −216 | −218 | −219 | −221 | −221 | −223 | −220 | −199 | −177 |
| −35 | −239 | −239 | −239 | −240 | −241 | −242 | −241 | −244 | −244 | −242 | −220 | −199 | −177 |
| −40 | −273 | −272 | −271 | −270 | −271 | −271 | −270 | −272 | −260 | −242 | −220 | −199 | −177 |
| −45 | −308 | −307 | −306 | −305 | −304 | −303 | −302 | −283 | −260 | −242 | −220 | −199 | −177 |
| −50 | −344 | −343 | −342 | −341 | −340 | −340 | −310 | −283 | −260 | −242 | −220 | −199 | −177 |
| −55 | −382 | −381 | −380 | −378 | −372 | −341 | −310 | −283 | −260 | −242 | −220 | −199 | −177 |
| −60 | −419 | −418 | −417 | −404 | −372 | −341 | −310 | −283 | −260 | −242 | −220 | −199 | −177 |
| −65 | −456 | −455 | −436 | −404 | −372 | −341 | −310 | −283 | −260 | −242 | −220 | −199 | −177 |
| −70 | −493 | −468 | −436 | −404 | −372 | −341 | −310 | −283 | −260 | −242 | −220 | −199 | −177 |
| −75 | −500 | −468 | −436 | −404 | −372 | −341 | −310 | −283 | −260 | −242 | −220 | −199 | −177 |
| −80 | −500 | −468 | −436 | −404 | −372 | −341 | −310 | −283 | −260 | −242 | −220 | −199 | −177 |

TABLE 2

$I_{FIELD}$ $\omega \longrightarrow$

| $T\downarrow$ | 0 | 16 | 32 | 48 | 64 | 80 | 96 | 112 | 128 | 144 | 160 | 176 | 192 |
|---|---|---|---|---|---|---|---|---|---|---|---|---|---|
| 80 | 50.0 | 50.0 | 23.6 | 23.9 | 24.0 | 29.8 | 24.2 | 24.1 | 24.0 | 24.2 | 21.4 | 18.1 | 18.0 |
| 75 | 50.0 | 50.0 | 23.6 | 23.9 | 24.0 | 29.8 | 24.2 | 24.1 | 24.0 | 24.2 | 21.4 | 18.1 | 18.0 |

TABLE 2-continued $I_{FIELD}$

| | | | | | | | | | | | | | |
|---|---|---|---|---|---|---|---|---|---|---|---|---|---|
| 70 | 23.8 | 24.2 | 23.5 | 23.8 | 23.4 | 23.4 | 23.5 | 23.5 | 23.6 | 23.7 | 23.2 | 18.1 | 18.0 |
| 65 | 23.6 | 23.7 | 23.4 | 23.5 | 23.9 | 24.2 | 23.3 | 23.4 | 23.4 | 23.4 | 23.5 | 18.1 | 18.0 |
| 60 | 23.4 | 23.5 | 23.8 | 23.4 | 23.6 | 23.7 | 23.8 | 23.9 | 24.2 | 23.3 | 23.3 | 20.8 | 18.0 |
| 55 | 24.2 | 23.3 | 23.5 | 23.9 | 23.4 | 23.4 | 23.5 | 23.5 | 23.6 | 23.7 | 23.8 | 23.9 | 18.0 |
| 50 | 23.6 | 23.8 | 23.3 | 23.5 | 23.2 | 23.2 | 23.3 | 23.4 | 23.4 | 23.4 | 23.5 | 23.5 | 19.8 |
| 45 | 23.4 | 23.5 | 24.0 | 23.3 | 23.6 | 23.8 | 24.0 | 23.1 | 23.2 | 23.2 | 23.3 | 23.3 | 23.3 |
| 40 | 23.1 | 23.3 | 23.5 | 23.1 | 23.4 | 23.4 | 23.5 | 24.0 | 23.9 | 23.0 | 23.0 | 23.0 | 23.1 |
| 35 | 23.7 | 29.0 | 23.3 | 23.6 | 23.1 | 23.1 | 23.2 | 23.3 | 23.4 | 23.4 | 23.5 | 23.6 | 23.7 |
| 30 | 23.3 | 23.5 | 22.9 | 23.3 | 23.8 | 22.8 | 22.8 | 22.9 | 23.0 | 23.1 | 23.1 | 23.2 | 23.3 |
| 25 | 23.0 | 23.1 | 23.6 | 22.8 | 23.3 | 23.4 | 23.5 | 23.8 | 22.6 | 22.6 | 22.7 | 22.7 | 22.8 |
| 20 | 22.5 | 22.7 | 23.1 | 23.8 | 22.8 | 22.9 | 23.0 | 23.2 | 23.3 | 23.4 | 23.5 | 23.8 | 22.2 |
| 15 | 23.2 | 23.5 | 22.5 | 23.0 | 22.2 | 22.3 | 22.4 | 22.5 | 22.6 | 22.7 | 22.7 | 22.8 | 22.9 |
| 10 | 22.4 | 22.7 | 23.9 | 22.2 | 23.0 | 23.3 | 23.8 | 21.3 | 21.3 | 21.4 | 21.4 | 21.4 | 21.4 |
| 5 | 20.8 | 21.1 | 22.2 | 20.3 | 21.1 | 21.2 | 21.4 | 21.6 | 21.8 | 22.4 | 16.0 | 15.3 | 14.4 |
| 0 | 3.6 | 4.3 | 5.9 | 5.8 | 5.6 | 5.1 | 4.7 | 4.3 | 4.1 | 3.8 | 3.6 | 3.2 | 3.1 |
| −5 | −6.3 | −5.6 | −5.4 | 5.0 | 4.9 | 4.7 | 4.5 | 4.4 | 4.2 | 4.1 | 4.0 | 3.9 | 3.8 |
| −10 | −8.8 | −8.7 | −8.2 | 8.6 | 8.2 | 8.1 | 7.8 | 7.5 | 7.3 | 7.1 | 6.9 | 6.7 | 6.5 |
| −15 | −10.8 | −10.6 | −10.3 | 11.3 | 11.3 | 11.0 | 10.7 | 10.5 | 10.2 | 10.0 | 9.7 | 9.4 | 9.0 |
| −20 | −12.5 | −12.3 | −12.0 | 14.2 | 13.9 | 13.8 | 13.8 | 13.8 | 13.5 | 12.7 | 12.5 | 12.2 | 11.9 |
| −25 | −14.4 | −14.0 | −13.8 | −13.8 | 18.1 | 18.1 | 16.9 | 16.9 | 16.5 | 16.1 | 15.6 | 15.1 | 14.6 |
| −30 | −16.3 | −16.0 | −15.7 | −15.3 | 20.6 | 20.6 | 20.6 | 20.5 | 20.1 | 19.9 | 19.5 | 19.1 | 19.1 |
| −35 | −18.1 | −18.1 | −18.1 | −18.1 | 22.1 | 22.1 | 22.1 | 22.1 | 22.1 | 21.8 | 21.3 | 21.3 | 21.3 |
| −40 | −19.9 | −19.9 | −19.9 | −19.6 | 22.8 | 22.8 | 22.8 | 22.8 | 22.8 | 22.8 | 22.8 | 22.8 | 22.4 |
| −45 | −21.0 | −20.8 | −20.6 | −20.6 | 23.5 | 23.4 | 23.2 | 23.0 | 22.8 | 22.8 | 22.8 | 22.8 | 22.8 |
| −50 | −21.3 | −21.3 | −21.3 | −21.3 | 23.5 | 23.5 | 23.5 | 23.5 | 23.5 | 23.5 | 23.5 | 23.5 | 23.5 |
| −55 | −22.1 | −22.1 | −22.1 | −22.1 | 23.5 | 23.5 | 23.5 | 23.5 | 23.5 | 23.5 | 23.5 | 23.5 | 23.5 |
| −60 | −22.3 | −22.1 | −22.1 | −22.1 | 23.9 | 23.9 | 23.9 | 23.9 | 23.9 | 23.9 | 23.7 | 23.5 | 23.5 |
| −65 | −22.8 | −22.8 | −22.8 | −22.8 | −22.8 | 23.9 | 23.9 | 23.9 | 23.9 | 23.9 | 23.9 | 23.9 | 23.9 |
| −70 | −22.8 | −22.8 | −22.8 | −22.8 | −22.8 | 23.9 | 23.9 | 23.9 | 23.9 | 23.9 | 23.9 | 23.9 | 23.9 |
| −75 | −22.8 | −22.8 | −22.8 | −22.8 | −22.8 | 23.9 | 23.9 | 23.9 | 23.9 | 23.9 | 23.9 | 23.9 | 23.9 |
| −80 | −23.5 | −23.5 | −23.5 | −23.5 | −23.5 | 23.9 | 23.9 | 23.9 | 23.9 | 23.9 | 23.9 | 23.9 | 23.9 |

$\omega \longleftrightarrow$

| T↓ | 208 | 224 | 240 | 256 | 272 | 288 | 304 | 320 | 336 | 352 | 368 | 384 | 400 |
|---|---|---|---|---|---|---|---|---|---|---|---|---|---|
| 40 | 15.6 | 13.2 | 10.9 | 9.3 | 8.1 | 7.2 | 6.4 | 5.0 | 5.5 | 5.1 | | | |
| 37.5 | | 14.2 | 10.9 | 9.3 | 8.1 | 7.2 | 6.4 | 5.0 | 5.5 | 5.1 | | | |
| 35 | 15.6 | 15.8 | 10.9 | 9.3 | 8.1 | 7.2 | 6.4 | 5.0 | 5.5 | 5.1 | | | |
| 32.5 | | 17.8 | 12.3 | 9.3 | 8.1 | 7.2 | 6.4 | 5.0 | 5.5 | 5.1 | | | |
| 30 | 15.6 | 19.1 | 19.8 | 10.1 | 8.1 | 7.2 | 6.4 | 5.0 | 5.5 | 5.1 | | | |
| 27.5 | | 20.7 | 14.6 | 11.0 | 8.8 | 7.2 | 6.4 | 5.0 | 5.5 | 5.1 | | | |
| 25 | 15.6 | 22.9 | 15.7 | 12.1 | 9.4 | 7.7 | 6.6 | 5.0 | 5.5 | 5.1 | | | |
| 22.5 | | 23.4 | 17.8 | 13.3 | 10.2 | 8.3 | 7.1 | 6.2 | 5.5 | 5.1 | | | |
| 20 | 19.2 | 22.2 | 18.5 | 14.8 | 11.1 | 8.9 | 7.6 | 6.6 | 5.9 | 5.3 | 4.8 | 4.5 | 4.2 |
| 17.5 | | 22.6 | 20.2 | 15.8 | 12.1 | 9.7 | 8.1 | 7.0 | 6.2 | 6.6 | 5.1 | 4.7 | 4.3 |
| 15 | 23.3 | 23.2 | 23.4 | 17.0 | 13.0 | 10.5 | 8.8 | 7.5 | 6.7 | 5.9 | 5.4 | 4.9 | 4.6 |
| 12.5 | | 21.3 | 21.2 | 18.0 | 13.0 | 11.4 | 9.5 | 8.0 | 7.1 | 6.3 | 5.7 | 5.2 | 4.9 |
| 10 | 22.2 | 21.3 | 21.2 | 18.4 | 14.8 | 11.8 | 10.0 | 8.5 | 7.6 | 6.7 | 6.1 | 5.5 | 5.1 |
| 7.5 | | 21.6 | 21.3 | 15.0 | 13.4 | 12.9 | 10.5 | 9.1 | 7.8 | 7.1 | 6.4 | 5.9 | 5.4 |
| 5 | 21.3 | 16.3 | 14.7 | 13.4 | 12.4 | 11.4 | 10.7 | 9.0 | 8.0 | 7.3 | 6.8 | 6.1 | 5.7 |
| 2.5 | | 17.9 | 18.7 | 19.0 | 8.5 | 13.7 | 8.2 | 9.0 | 7.0 | 7.2 | 6.7 | 6.3 | 6.0 |
| 0 | 3.0 | 2.8 | 2.7 | 2.6 | 2.6 | 2.5 | 2.4 | 2.3 | 2.3 | 2.2 | 2.1 | 2.0 | 2.0 |
| −5 | 3.7 | 3.6 | 3.5 | 3.4 | 3.3 | 3.3 | 3.2 | 3.1 | 3.1 | 3.0 | 3.0 | 3.0 | 2.9 |
| −10 | 6.3 | 6.1 | 6.0 | 5.8 | 5.6 | 5.5 | 5.4 | 5.3 | 5.2 | 5.1 | 4.0 | 4.9 | 4.8 |
| −15 | 8.8 | 8.7 | 8.5 | 8.2 | 8.0 | 7.7 | 7.5 | 7.4 | 7.2 | 7.0 | 6.9 | 6.7 | 6.6 |
| −20 | 11.5 | 11.3 | 11.1 | 10.7 | 10.4 | 10.1 | 9.9 | 9.6 | 9.3 | 9.0 | 8.8 | 8.7 | 8.5 |
| −25 | 14.4 | 14.1 | 13.8 | 13.7 | 13.0 | 12.6 | 12.4 | 12.0 | 11.7 | 11.3 | 11.2 | 10.9 | 8.8 |
| −30 | 18.1 | 18.1 | 18.1 | 16.6 | 16.1 | 15.6 | 15.1 | 14.6 | 14.4 | 13.9 | 13.5 | 11.0 | 8.8 |
| −35 | 21.0 | 20.6 | 20.4 | 19.9 | 19.5 | 19.1 | 19.1 | 18.1 | 18.1 | 16.1 | 13.5 | 11.0 | 8.8 |
| −40 | 22.1 | 22.1 | 22.1 | 22.1 | 21.6 | 21.3 | 21.3 | 20.6 | 18.1 | 16.1 | 13.5 | 11.0 | 8.8 |
| −45 | 22.8 | 22.8 | 22.8 | 22.8 | 22.8 | 22.8 | 22.7 | 21.3 | 19.2 | 16.1 | 13.5 | 11.0 | 8.8 |
| −50 | 23.5 | 23.5 | 23.5 | 23.5 | 23.5 | 23.2 | 22.8 | 21.3 | 19.2 | 16.1 | 13.5 | 11.0 | 8.8 |
| −55 | 23.5 | 23.5 | 23.5 | 23.5 | 23.5 | 23.4 | 22.8 | 21.3 | 19.2 | 16.1 | 13.5 | 11.0 | 8.8 |
| −60 | 23.5 | 23.5 | 23.5 | 23.5 | 23.5 | 23.4 | 22.8 | 21.3 | 19.2 | 16.1 | 13.5 | 11.0 | 8.8 |
| −65 | 23.9 | 23.9 | 23.9 | 23.5 | 23.5 | 23.4 | 22.8 | 21.3 | 19.2 | 16.1 | 13.5 | 11.0 | 8.8 |
| −70 | 23.9 | 23.9 | 23.9 | 23.5 | 23.5 | 23.4 | 22.8 | 21.3 | 19.2 | 16.1 | 13.5 | 11.0 | 8.8 |
| −75 | 23.9 | 23.9 | 23.9 | 23.5 | 23.5 | 23.4 | 22.8 | 21.3 | 19.2 | 16.1 | 13.5 | 11.0 | 8.8 |
| −80 | 23.9 | 23.9 | 23.9 | 23.5 | 23.5 | 23.4 | 22.8 | 21.3 | 19.2 | 16.1 | 13.5 | 11.0 | 8.8 |

TABLE 3

$V^A$

| $\omega \longleftrightarrow$ | | | | | | | | | | | | | |
|---|---|---|---|---|---|---|---|---|---|---|---|---|---|
| T↕ | 0 | 16 | 32 | 48 | 64 | 80 | 96 | 112 | 128 | 144 | 160 | 176 | 192 |
| 80 | 7.8 | 9.8 | 11.9 | 14.1 | 16.2 | 18.3 | 20.5 | 22.6 | 24.8 | 26.9 | 28.7 | 29.4 | 30.6 |
| 75 | 7.8 | 9.8 | 11.9 | 14.1 | 16.2 | 18.3 | 20.5 | 22.6 | 24.8 | 26.9 | 28.7 | 29.4 | 30.6 |
| 70 | 7.4 | 9.5 | 11.7 | 13.8 | 16.0 | 18.1 | 20.3 | 22.5 | 24.6 | 26.8 | 28.9 | 29.4 | 30.6 |
| 65 | 7.1 | 9.1 | 11.3 | 13.4 | 15.6 | 17.8 | 19.9 | 22.1 | 24.2 | 26.4 | 28.5 | 29.4 | 30.6 |
| 60 | 6.7 | 8.7 | 10.9 | 13.1 | 15.2 | 17.4 | 19.5 | 21.7 | 23.9 | 26.0 | 28.1 | 29.9 | 30.6 |
| 55 | 6.3 | 8.3 | 10.5 | 12.7 | 14.8 | 17.0 | 19.2 | 21.3 | 23.5 | 25.6 | 27.8 | 30.0 | 30.6 |
| 50 | 5.9 | 8.0 | 10.1 | 12.3 | 14.5 | 16.6 | 18.8 | 20.9 | 23.1 | 25.2 | 27.4 | 29.6 | 30.9 |
| 45 | 5.5 | 7.6 | 9.8 | 11.9 | 14.1 | 16.2 | 18.4 | 20.5 | 22.7 | 24.8 | 27.0 | 29.2 | 31.3 |
| 40 | 5.1 | 7.2 | 9.3 | 11.5 | 13.7 | 15.8 | 18.0 | 20.2 | 22.3 | 24.5 | 26.6 | 28.7 | 30.9 |
| 35 | 4.7 | 6.7 | 8.9 | 11.1 | 13.2 | 15.4 | 17.6 | 19.7 | 21.9 | 24.0 | 26.2 | 28.4 | 30.5 |
| 30 | 4.2 | 6.3 | 8.5 | 10.6 | 12.8 | 14.9 | 17.1 | 19.2 | 21.4 | 23.6 | 25.7 | 27.9 | 30.0 |
| 25 | 3.7 | 5.8 | 8.0 | 10.1 | 12.3 | 14.5 | 16.6 | 18.8 | 20.9 | 23.0 | 25.2 | 27.3 | 29.5 |
| 20 | 3.2 | 5.2 | 7.4 | 9.6 | 11.8 | 13.9 | 16.1 | 18.2 | 20.4 | 22.6 | 24.8 | 26.9 | 28.9 |
| 15 | 2.6 | 4.7 | 6.8 | 9.0 | 11.2 | 13.3 | 15.5 | 17.6 | 19.8 | 21.9 | 24.1 | 26.3 | 28.4 |
| 10 | 2.0 | 4.0 | 6.2 | 8.4 | 10.6 | 12.7 | 14.9 | 16.8 | 19.0 | 21.1 | 23.2 | 25.4 | 27.5 |
| 5 | 1.3 | 3.3 | 5.5 | 7.6 | 9.7 | 11.9 | 14.0 | 16.2 | 18.4 | 20.6 | 21.1 | 22.8 | 24.4 |
| 0 | 0.0 | 1.6 | 3.2 | 4.7 | 6.0 | 6.9 | 7.8 | 8.6 | 9.4 | 10.0 | 10.6 | 10.7 | 11.2 |
| −5 | 1.3 | −0.2 | −1.5 | 4.1 | 5.3 | 6.4 | 7.4 | 8.5 | 9.4 | 10.3 | 11.2 | 12.0 | 12.8 |
| −10 | 2.1 | 0.2 | −1.4 | 5.8 | 7.3 | 8.9 | 10.4 | 11.8 | 13.2 | 14.5 | 15.9 | 17.2 | 18.4 |
| −15 | 2.7 | 0.8 | −0.9 | 6.9 | 8.7 | 10.4 | 12.1 | 13.8 | 15.4 | 17.0 | 18.6 | 20.1 | 21.6 |
| −20 | 3.3 | 1.3 | −0.5 | 7.9 | 9.7 | 11.6 | 13.5 | 15.4 | 17.2 | 18.8 | 20.6 | 22.3 | 24.0 |
| −25 | 3.8 | 1.8 | −0.1 | −2.1 | 10.9 | 12.9 | 14.8 | 16.7 | 18.6 | 20.5 | 22.3 | 24.1 | 25.9 |
| −30 | 4.2 | 2.2 | 0.2 | −1.7 | 11.9 | 14.0 | 16.0 | 18.1 | 20.1 | 22.1 | 24.1 | 26.0 | 28.1 |
| −35 | 4.6 | 2.5 | 0.4 | −1.6 | 12.9 | 15.0 | 17.1 | 19.2 | 21.3 | 23.4 | 25.4 | 27.5 | 29.6 |
| −40 | 5.0 | 2.8 | 0.7 | −1.4 | 14.0 | 16.1 | 18.2 | 20.3 | 22.4 | 24.5 | 26.7 | 28.8 | 30.8 |
| −45 | 5.4 | 3.2 | 1.1 | −1.1 | 15.2 | 17.4 | 18.5 | 21.6 | 23.7 | 25.8 | 27.9 | 30.0 | 32.1 |
| −50 | 5.8 | 3.5 | 4.4 | −0.7 | 16.6 | 18.7 | 20.8 | 22.9 | 25.0 | 27.1 | 29.2 | 31.3 | 33.4 |
| −55 | 6.1 | 3.9 | 1.7 | −0.4 | 18.1 | 20.2 | 22.3 | 24.4 | 26.5 | 28.6 | 30.7 | 32.8 | 34.9 |
| −60 | 6.5 | 4.3 | 2.1 | −0.1 | 19.7 | 21.8 | 23.9 | 26.0 | 28.1 | 30.2 | 32.3 | 34.4 | 36.5 |
| −65 | 6.8 | 4.6 | 2.4 | 0.3 | −1.9 | 23.6 | 25.6 | 27.7 | 29.8 | 31.9 | 34.0 | 36.1 | 38.2 |
| −70 | 7.2 | 5.0 | 2.8 | 0.6 | −1.5 | 25.5 | 27.6 | 29.6 | 31.7 | 33.8 | 35.9 | 38.0 | 40.1 |
| −75 | 7.6 | 5.4 | 3.2 | 1.0 | −1.1 | 27.6 | 29.6 | 31.7 | 33.8 | 35.9 | 38.0 | 40.1 | 42.1 |
| −80 | 8.0 | 5.8 | 3.6 | 1.4 | −0.8 | 29.8 | 31.9 | 34.0 | 36.0 | 38.1 | 40.2 | 41.9 | 42.1 |

| $\omega \longleftrightarrow$ | | | | | | | | | | | | | |
|---|---|---|---|---|---|---|---|---|---|---|---|---|---|
| T↕ | 208 | 224 | 240 | 256 | 272 | 288 | 304 | 320 | 336 | 352 | 368 | 384 | 400 |
| 40 | 31.2 | 31.7 | 31.9 | 32.2 | 32.3 | 32.4 | 32.4 | 32.5 | 32.6 | 32.7 | | | |
| 37.5 | | 32.0 | 31.9 | 32.2 | 32.3 | 32.4 | 32.4 | 32.5 | 32.6 | 32.7 | | | |
| 35 | 31.2 | 32.4 | 31.9 | 32.2 | 32.3 | 32.4 | 32.4 | 32.5 | 32.6 | 32.7 | | | |
| 32.5 | | 32.8 | 32.5 | 32.2 | 32.3 | 32.4 | 32.4 | 32.5 | 32.6 | 32.7 | | | |
| 30 | 31.2 | 33.2 | 32.9 | 32.6 | 32.3 | 32.4 | 32.4 | 32.5 | 32.6 | 32.7 | | | |
| 27.5 | | 33.6 | 33.1 | 33.0 | 32.7 | 32.4 | 32.4 | 32.5 | 32.6 | 32.7 | | | |
| 25 | 31.2 | 33.8 | 33.3 | 33.4 | 33.1 | 32.9 | 32.6 | 32.5 | 32.6 | 32.7 | | | |
| 22.5 | | 33.6 | 33.9 | 33.8 | 33.6 | 33.3 | 33.2 | 32.9 | 32.7 | 32.7 | | | |
| 20 | 32.0 | 33.2 | 33.9 | 34.2 | 33.9 | 33.8 | 33.8 | 33.4 | 33.3 | 33.0 | 32.8 | 32.9 | 32.8 |
| 17.5 | | 33.0 | 34.4 | 34.5 | 34.3 | 34.1 | 34.1 | 33.9 | 33.7 | 33.5 | 33.4 | 33.2 | 33.0 |
| 15 | 32.2 | 32.8 | 35.0 | 34.7 | 34.8 | 34.6 | 34.6 | 34.4 | 34.3 | 34.1 | 33.9 | 33.8 | 33.7 |
| 12.5 | | 32.0 | 34.1 | 34.9 | 34.8 | 35.0 | 35.0 | 34.8 | 34.7 | 34.5 | 34.5 | 34.4 | 34.3 |
| 10 | 31.0 | 31.7 | 33.8 | 34.7 | 35.0 | 35.0 | 35.0 | 25.2 | 35.1 | 35.1 | 35.1 | 35.0 | 34.8 |
| 7.5 | | 31.5 | 33.6 | 33.2 | 33.8 | 35.3 | 35.3 | 35.4 | 35.2 | 35.5 | 35.4 | 34.4 | 35.1 |
| 5 | 29.6 | 29.1 | 30.3 | 31.6 | 32.7 | 33.9 | 35.0 | 35.0 | 35.1 | 35.4 | 35.7 | 35.5 | 35.8 |
| 2.5 | | 29.3 | 31.6 | 33.9 | 28.8 | 35.1 | 31.7 | 34.4 | 34.4 | 34.7 | 35.1 | 35.5 | 36.0 |
| 0 | 11.7 | 12.1 | 12.6 | 13.0 | 13.3 | 13.7 | 14.0 | 14.3 | 14.6 | 14.9 | 15.2 | 15.0 | 15.3 |
| −5 | 13.6 | 14.3 | 15.0 | 15.7 | 16.4 | 17.1 | 17.7 | 18.4 | 19.1 | 19.7 | 20.3 | 20.9 | 21.4 |
| −10 | 19.6 | 20.8 | 21.9 | 23.0 | 24.0 | 25.2 | 26.2 | 27.1 | 28.1 | 29.0 | 30.1 | 31.0 | 31.9 |
| −15 | 23.1 | 24.7 | 26.0 | 27.3 | 28.7 | 30.0 | 31.2 | 32.5 | 33.7 | 34.8 | 36.1 | 37.2 | 38.3 |
| −20 | 25.6 | 27.3 | 28.9 | 30.4 | 32.0 | 33.4 | 35.0 | 36.4 | 37.7 | 39.1 | 40.4 | 42.0 | 43.2 |
| −25 | 27.7 | 29.5 | 31.3 | 33.1 | 34.6 | 36.2 | 37.9 | 39.4 | 41.0 | 42.5 | 44.2 | 45.6 | 45.0 |
| −30 | 29.8 | 31.8 | 33.9 | 35.3 | 37.0 | 38.7 | 40.4 | 42.1 | 43.9 | 45.5 | 47.0 | 45.8 | 44.0 |
| −35 | 31.6 | 33.5 | 35.6 | 37.4 | 39.4 | 41.2 | 43.3 | 44.9 | 46.9 | 47.5 | 47.0 | 45.8 | 44.0 |
| −40 | 32.9 | 35.0 | 37.1 | 39.1 | 41.1 | 43.1 | 45.2 | 47.0 | 48.0 | 47.5 | 47.0 | 45.8 | 44.0 |
| −45 | 34.2 | 36.3 | 38.4 | 40.5 | 42.6 | 44.7 | 46.8 | 47.7 | 48.0 | 47.5 | 47.0 | 45.8 | 44.0 |
| −50 | 35.5 | 37.6 | 39.7 | 41.8 | 43.9 | 46.0 | 47.0 | 47.7 | 48.0 | 47.5 | 47.0 | 45.8 | 44.0 |
| −55 | 37.0 | 39.1 | 41.2 | 43.3 | 45.2 | 46.1 | 47.0 | 47.7 | 48.0 | 47.5 | 47.0 | 45.8 | 44.0 |
| −60 | 38.6 | 40.7 | 42.7 | 44.3 | 45.2 | 46.1 | 47.0 | 47.7 | 48.0 | 47.5 | 47.0 | 45.8 | 44.0 |
| −65 | 40.3 | 42.4 | 43.6 | 44.3 | 45.2 | 46.1 | 47.0 | 47.7 | 48.0 | 47.5 | 47.0 | 45.8 | 44.0 |
| −70 | 42.2 | 43.0 | 43.6 | 44.3 | 45.2 | 46.1 | 47.0 | 47.7 | 48.0 | 47.5 | 47.0 | 45.8 | 44.0 |
| −75 | 42.5 | 43.0 | 43.6 | 44.3 | 45.2 | 46.1 | 47.0 | 47.7 | 48.0 | 47.5 | 47.0 | 45.8 | 44.0 |
| −80 | 42.5 | 43.0 | 43.6 | 44.3 | 45.2 | 46.1 | 47.0 | 47.7 | 48.0 | 47.5 | 47.0 | 45.8 | 44.0 |

TABLE 4

Expected Torque

| T↓ \ ω→ | 0 | 16 | 32 | 48 | 64 | 80 | 96 | 112 | 128 | 144 | 160 | 176 | 192 |
|---|---|---|---|---|---|---|---|---|---|---|---|---|---|
| 80 | 73.6 | 73.6 | 73.1 | 72.7 | 72.5 | 72.4 | 72.2 | 72.1 | 71.9 | 71.8 | 70.5 | 62.1 | 52.0 |
| 75 | 73.6 | 73.6 | 73.1 | 72.7 | 72.5 | 72.4 | 72.2 | 72.1 | 71.9 | 71.8 | 70.5 | 62.1 | 52.0 |
| 70 | 70.0 | 70.0 | 70.0 | 70.0 | 70.0 | 70.0 | 70.0 | 70.0 | 70.0 | 70.0 | 70.0 | 62.1 | 52.0 |
| 65 | 65.0 | 65.0 | 65.0 | 65.0 | 65.0 | 65.0 | 65.0 | 65.0 | 65.0 | 65.0 | 65.0 | 62.1 | 52.0 |
| 60 | 60.0 | 60.0 | 60.0 | 60.0 | 60.0 | 60.0 | 60.0 | 60.0 | 60.0 | 60.0 | 60.0 | 60.0 | 52.0 |
| 55 | 55.0 | 55.0 | 55.0 | 55.0 | 55.0 | 55.0 | 55.0 | 55.0 | 55.0 | 55.0 | 55.0 | 55.0 | 52.0 |
| 50 | 50.0 | 50.0 | 50.0 | 50.0 | 50.0 | 50.0 | 50.0 | 50.0 | 50.0 | 50.0 | 50.0 | 50.0 | 50.0 |
| 45 | 45.0 | 45.0 | 45.0 | 45.0 | 45.0 | 45.0 | 45.0 | 45.0 | 45.0 | 45.0 | 45.0 | 45.0 | 45.0 |
| 40 | 40.0 | 40.0 | 40.0 | 40.0 | 40.0 | 40.0 | 40.0 | 40.0 | 40.0 | 40.0 | 40.0 | 40.0 | 40.0 |
| 35 | 35.0 | 35.0 | 35.0 | 35.0 | 35.0 | 35.0 | 35.0 | 35.0 | 35.0 | 35.0 | 35.0 | 35.0 | 35.0 |
| 30 | 30.0 | 30.0 | 30.0 | 30.0 | 30.0 | 30.0 | 30.0 | 30.0 | 30.0 | 30.0 | 30.0 | 30.0 | 30.0 |
| 25 | 25.0 | 25.0 | 25.0 | 25.0 | 25.0 | 25.0 | 25.0 | 25.0 | 25.0 | 25.0 | 25.0 | 25.0 | 25.0 |
| 20 | 20.0 | 20.0 | 20.0 | 20.0 | 20.0 | 20.0 | 20.0 | 20.0 | 20.0 | 20.0 | 20.0 | 20.0 | 20.0 |
| 15 | 15.0 | 15.0 | 15.0 | 15.0 | 15.0 | 15.0 | 15.0 | 15.0 | 15.0 | 15.0 | 15.0 | 15.0 | 15.0 |
| 10 | 10.0 | 10.0 | 10.0 | 10.0 | 10.0 | 10.0 | 100 | 10.0 | 10.0 | 10.0 | 10.0 | 10.0 | 10.0 |
| 5 | 5.0 | 5.0 | 5.0 | 5.0 | 5.0 | 5.0 | 5.0 | 5.0 | 5.0 | 5.0 | 5.0 | 5.0 | 5.0 |
| 0 | 0 | 0 | 0 | 0 | 0 | 0 | 0 | 0 | 0 | 0 | 0 | 0 | 0 |
| −5 | −5.0 | −5.0 | −5.0 | −5.0 | −5.0 | −5.0 | −5.0 | −5.0 | −5.0 | −5.0 | −5.0 | −5.0 | −5.0 |
| −10 | −10.0 | −10.0 | −10.0 | −10.0 | −10.0 | −10.0 | −10.0 | −10.0 | −10.0 | −10.0 | −10.0 | −10.0 | −10.0 |
| −15 | −15.0 | −15.0 | −15.0 | −15.0 | −15.0 | −15.0 | −15.0 | −15.0 | −15.0 | −15.0 | −15.0 | −15.0 | −15.0 |
| −20 | −20.0 | −20.0 | −20.0 | −20.0 | −20.0 | −20.0 | −20.0 | −20.0 | −20.0 | −20.0 | −20.0 | −20.0 | −20.0 |
| −25 | −25.0 | −25.0 | −25.0 | −25.0 | −25.0 | −25.0 | −25.0 | −25.0 | −25.0 | −25.0 | −25.0 | −25.0 | −25.0 |
| −30 | −30.0 | −30.0 | −30.0 | −30.0 | −30.0 | −30.0 | −30.0 | −30.0 | −30.0 | −30.0 | −30.0 | −30.0 | −30.0 |
| −35 | −35.0 | −35.0 | −35.0 | −35.0 | −35.0 | −35.0 | −35.0 | −35.0 | −35.0 | −35.0 | −35.0 | −35.0 | −35.0 |
| −40 | −40.0 | −40.0 | −40.0 | −40.0 | −40.0 | −40.0 | −40.0 | −40.0 | −40.0 | −40.0 | −40.0 | −40.0 | −40.0 |
| −45 | −45.0 | −45.0 | −45.0 | −45.0 | −45.0 | −45.0 | −45.0 | −45.0 | −45.0 | −45.0 | −45.0 | −45.0 | −45.0 |
| −50 | −50.0 | −50.0 | −50.0 | −50.0 | −50.0 | −50.0 | −50.0 | −50.0 | −50.0 | −50.0 | −50.0 | −50.0 | −50.0 |
| −55 | −55.0 | −55.0 | −55.0 | −55.0 | −55.0 | −55.0 | −55.0 | −55.0 | −55.0 | −55.0 | −55.0 | −55.0 | −55.0 |
| −60 | −60.0 | −60.0 | −60.0 | −60.0 | −60.0 | −60.0 | −60.0 | −60.0 | −60.0 | −60.0 | −60.0 | −60.0 | −60.0 |
| −65 | −65.0 | −65.0 | −65.0 | −65.0 | −65.0 | −65.0 | −65.0 | −65.0 | −65.0 | −65.0 | −65.0 | −65.0 | −65.0 |
| −70 | −70.0 | −70.0 | −70.0 | −70.0 | −70.0 | −70.0 | −70.0 | −70.0 | −70.0 | −70.0 | −70.0 | −70.0 | −70.0 |
| −75 | −74.8 | −75.0 | −75.0 | −75.0 | −75.0 | −75.0 | −75.0 | −75.0 | −75.0 | −75.0 | −75.0 | −75.0 | −75.0 |
| −80 | −75.0 | −76.5 | −77.0 | −77.4 | −77.6 | −77.8 | −78.0 | −78.1 | −78.3 | −78.4 | −78.5 | −78.7 | −75.0 |

| T↓ \ ω→ | 208 | 224 | 240 | 256 | 272 | 288 | 1304 | 320 | 336 | 352 | 1368 | 384 | 460 |
|---|---|---|---|---|---|---|---|---|---|---|---|---|---|
| 40 | 44.6 | 39.3 | 35.3 | 32.2 | 29.8 | 27.7 | 25.9 | 24.2 | 22.6 | 21.2 | | | |
| 37.5 | | 37.6 | 35.3 | 32.2 | 29.8 | 27.7 | 25.9 | 24.2 | 22.6 | 21.2 | | | |
| 35 | 44.6 | 35.0 | 35.0 | 32.2 | 29.8 | 27.7 | 25.9 | 24.2 | 22.6 | 21.2 | | | |
| 32.5 | | 32.5 | 32.5 | 32.2 | 29.8 | 27.7 | 25.9 | 24.2 | 22.6 | 21.2 | | | |
| 30 | 44.6 | 30.0 | 30.0 | 30.0 | 29.8 | 27.7 | 25.9 | 24.2 | 22.6 | 21.2 | | | |
| 27.5 | | 27.5 | 27.5 | 27.5 | 27.5 | 27.6 | 25.9 | 24.2 | 22.6 | 21.2 | | | |
| 25 | 44.6 | 25.0 | 25.0 | 25.0 | 25.0 | 25.0 | 25.0 | 24.2 | 22.6 | 21.2 | | | |
| 22.5 | | 22.6 | 22.6 | 22.6 | 22.6 | 22.6 | 22.6 | 22.6 | 22.6 | 21.2 | | | |
| 20 | 40.0 | 20.0 | 20.0 | 20.0 | 20.0 | 20.0 | 20.0 | 20.0 | 20.0 | 20.0 | 19.9 | 18.8 | 17.9 |
| 17.5 | | 17.6 | 17.6 | 17.6 | 17.6 | 17.6 | 17.6 | 17.6 | 17.6 | 17.6 | 17.5 | 17.5 | 17.5 |
| 15 | 30.0 | 15.0 | 15.0 | 15.0 | 15.0 | 15.0 | 15.0 | 15.0 | 15.0 | 15.0 | 15.0 | 15.0 | 15.0 |
| 12.5 | | 12.5 | 12.5 | 12.5 | 12.5 | 12.5 | 12.5 | 12.5 | 12.5 | 12.5 | 12.5 | 12.5 | 12.5 |
| 10 | 20.0 | 10.0 | 10.0 | 10.0 | 10.0 | 10.0 | 10.0 | 10.0 | 10.0 | 10.0 | 10.0 | 10.0 | 10.0 |
| 7.5 | | 7.5 | 7.5 | 7.5 | 7.5 | 7.5 | 7.5 | 7.5 | 7.5 | 7.5 | 7.5 | 7.5 | 7.5 |
| 5 | 10.0 | 6.0 | 6.0 | 6.0 | 6.0 | 6.0 | 6.0 | 6.0 | 6.0 | 6.0 | 5.0 | 5.0 | 5.0 |
| 2.5 | | 2.5 | 2.5 | 2.5 | 2.5 | 2.5 | 2.5 | 2.5 | 2.5 | 2.5 | 2.5 | 2.5 | 2.5 |
| 0 | 0.0 | 0.0 | 0.0 | 0.0 | 0.0 | 0.0 | 0.0 | 0.0 | 0.0 | 0.0 | 0.0 | 0.0 | 0.0 |
| −5 | −5.0 | −5.0 | −5.0 | −5.0 | −5.0 | −5.0 | −5.0 | −5.0 | −5.0 | −5.0 | −5.0 | −5.0 | −5.0 |
| −10 | −10.0 | −10.0 | −10.0 | −10.0 | −10.0 | −10.0 | −10.0 | −10.0 | −10.0 | −10.0 | −10.0 | −10.0 | −10.0 |
| −15 | −15.0 | −15.0 | −15.0 | −15.0 | −15.0 | −15.0 | −15.0 | −15.0 | −15.0 | −15.0 | −15.0 | −15.0 | −15.0 |
| −20 | −20.0 | −20.0 | −20.0 | −20.0 | −20.0 | −20.0 | −20.0 | −20.0 | −20.0 | −20.0 | −20.0 | −20.0 | −20.0 |
| −25 | −25.0 | −25.0 | −25.0 | −25.0 | −25.0 | −25.0 | −25.0 | −25.0 | −25.0 | −25.0 | −25.0 | −25.0 | −21.2 |
| −30 | −30.0 | −30.0 | −30.0 | −30.0 | −30.0 | −30.0 | −30.0 | −30.0 | −30.0 | −30.0 | −29.4 | −25.3 | −21.2 |
| −35 | −35.0 | −35.0 | −35.0 | −35.0 | −35.0 | −35.0 | −35.0 | −35.0 | −35.0 | −33.6 | −29.4 | −25.3 | −21.2 |
| −40 | −40.0 | −40.0 | −40.0 | −40.0 | −40.0 | −40.0 | −40.0 | −40.0 | −37.7 | −33.6 | −29.4 | −25.3 | −21.2 |
| −45 | −45.0 | −45.0 | −45.0 | −45.0 | −45.0 | −45.0 | −45.0 | −41.9 | −37.7 | −33.6 | −29.4 | −25.3 | −21.2 |
| −50 | −50.0 | −50.0 | −50.0 | −50.0 | −50.0 | −50.0 | −46.0 | −41.9 | −37.7 | −33.6 | −29.4 | −25.3 | −21.2 |
| −55 | −55.0 | −55.0 | −55.0 | −55.0 | −54.3 | −50.2 | −46.0 | −41.9 | −37.7 | −33.6 | −29.4 | −25.3 | −21.2 |
| −60 | −60.0 | −60.0 | −60.0 | −58.4 | −54.3 | −50.2 | −46.0 | −41.9 | −37.7 | −33.6 | −29.4 | −25.3 | −21.2 |
| −65 | −65.0 | −65.0 | −62.6 | −58.4 | −54.3 | −50.2 | −46.0 | −41.9 | −37.7 | −33.6 | −29.4 | −25.3 | −21.2 |
| −70 | −70.0 | −66.7 | −62.6 | −58.4 | −54.3 | −50.2 | −46.0 | −41.9 | −37.7 | −33.6 | −29.4 | −25.3 | −21.2 |
| −75 | −70.9 | −66.7 | −62.6 | −58.4 | −54.3 | −50.2 | −46.0 | −41.9 | −37.7 | −33.6 | −29.4 | −25.3 | −21.2 |
| −80 | −70.9 | −66.7 | −62.6 | −58.4 | −54.3 | −50.2 | −46.0 | −41.9 | −37.7 | −33.6 | −29.4 | −25.3 | −21.2 |

It is contemplated by the present invention that, through a conventional interpolation process, the above tables may be expanded to include more values corresponding to more frequent torque and speed intervals.

Within the motor control circuit 20 are closed loop control circuits for maintaining both the armature and the field current at desired values, namely, armature current control circuit 80 and field current control circuit 82, see FIGS. 1 and 3. The outputs from these circuits are connected to the armature assembly 12 and the field assembly 14 of the motor 10. These circuits receive feedback inputs from current sensors associated with the motor control circuits 80, 82.

Figure 2:
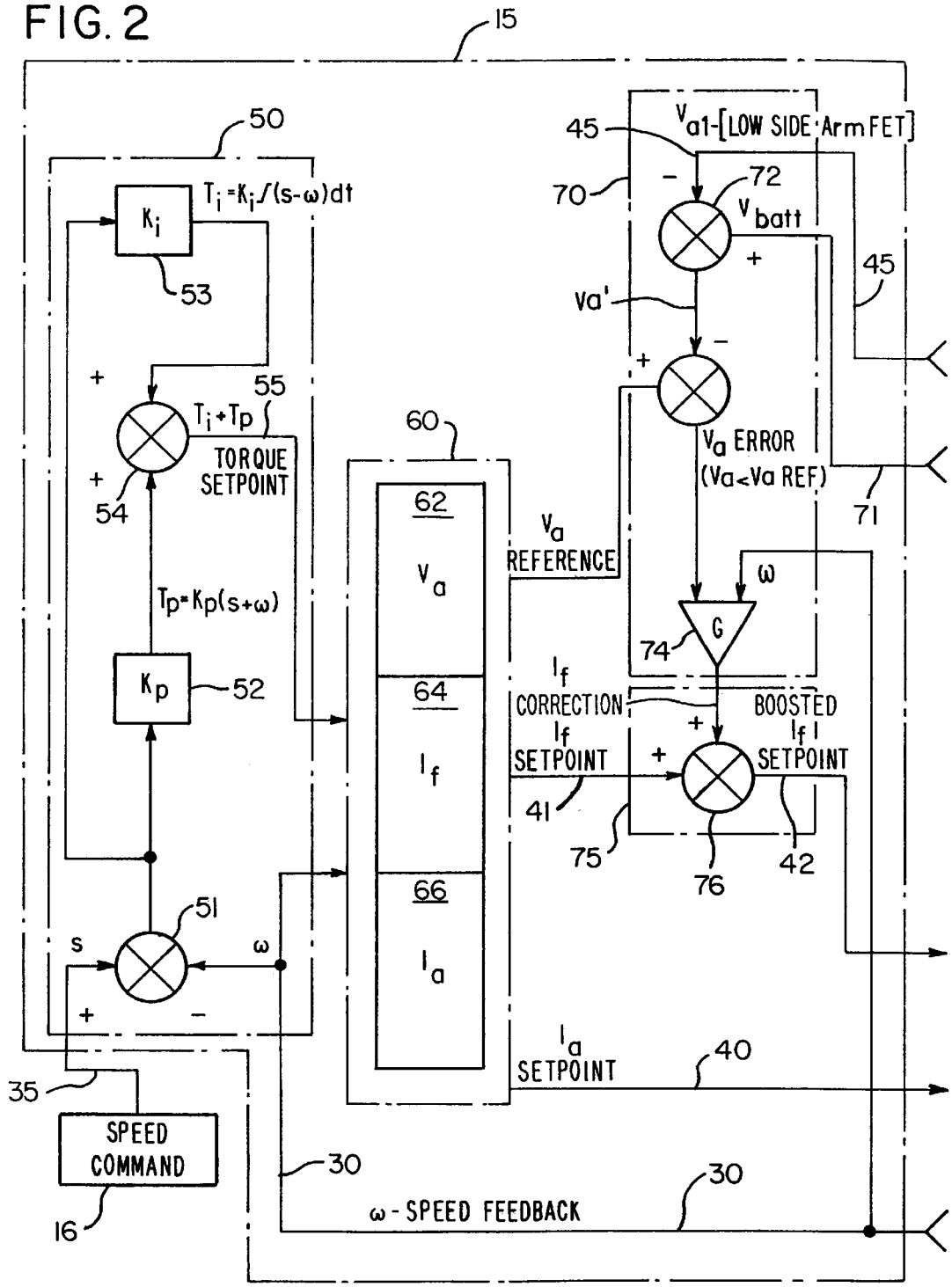

The armature current and adjusted field current setpoint values on the lines 40 and 42 are applied to closed-loop control circuits 80 and 82 after being converted to analog form by digital-to-analog converters 83 and 84, see FIGS. 2 and 3. The two control circuits 80 and 82 include current delivery circuits including a bridge logic arrangement which apply switching signals to an arrangement of MOSFET devices that separately regulate the flow of current from a battery 90 to the field and armature coils F and A, respectively. The current delivery circuits of the control circuits 80 and 82 include current sensors 96 and 97 which generate feedback signals, $I_a$ feedback 93 and $I_f$ feedback 94, respectively, proportional to the respective measured currents. These feedback signals are applied to a pair of comparators 85 and 86 for comparison with corresponding setpoint values. The comparators 85 and 86 then generate an armature current error signal and a field current error signal, respectively.

A pair of amplifiers 87, 88 multiply the field current error signal and the armature current error signal by gain factors $K_2$ and $K_3$, respectively. These circuits cause a pair of pulse width modulated (PWM) drives to supply battery current to the motor coils in pulses of constant amplitude and frequency. The amplitude of the pulses varies as a function of the state of charge of the associated battery. The duty cycles of the pulses correspond to the respective setpoint values. This effectively sets the average field current and the average armature current so as to develop the desired torque in the armature.

It should be appreciated that the armature voltage, as represented by the output of the comparator 72, will reflect flux losses. If there has been an unexpected loss of field flux, the torque generated by the motor will decrease. There will also be a concomitant decrease in the back EMF opposing the armature current driver, so the armature driver generates less average voltage to supply the demand for armature current. Therefore, in the present invention, actual armature voltage is compared to a desired armature voltage at a given torque and speed and is used to adjust the nominal field current value to achieve the desired actual torque.

Having described the invention in detail and by reference to preferred embodiments thereof, it will be apparent that modifications and variations are possible without departing from the scope of the invention defined in the appended claims.

What is claimed is:

1. A motor control system comprising:
   an electrical motor including
      an armature assembly responsive to an armature current, wherein a magnitude of said armature current is a function of a predetermined armature current setpoint and
      a field assembly responsive to a field current, wherein a magnitude of said field current is a function of a predetermined field current setpoint and a field current correction signal;
   a motor speed sensor arranged to generate an actual motor speed signal representative of an actual speed of said electrical motor;
   a speed command generator arranged to generate a speed command signal indicative of a desired speed of said electrical motor;
   an armature voltage sensor arranged to generate a measured armature voltage signal from an electrical potential of said armature assembly; and
   a microprocessor programmed to
      generate an armature voltage reference signal, said field current setpoint, and said armature current setpoint, wherein said armature voltage reference signal, said field current setpoint, and said armature current setpoint are generated as a function of said speed command signal and said actual motor speed signal,
      compare said armature voltage reference signal to said measured armature voltage signal and generate an armature voltage error signal based on said comparison, and
      generate said field current correction signal as a function of said armature voltage error signal.

2. A motor control system as claimed in claim 1 wherein said microprocessor is further programmed to generate said field current correction signal such that it is inversely proportional to said actual motor speed signal.

3. A motor control system as claimed in claim 1 wherein said microprocessor is further programmed to generate said field current correction signal as a function of at least one of said armature voltage error signal and said actual motor speed signal.

4. A motor control system as claimed in claim 3 wherein said microprocessor is further programmed to generate said field current correction signal as a function of said armature voltage error signal and said actual motor speed signal.

5. A motor control system as claimed in claim 3 wherein said microprocessor is further programmed to generate said field current correction signal $I_{f\_CORRECTION}$ according to the following equation:

$$I_{f\_CORRECTION} = V_{a\_ERROR} \times C_1 \times (G_v/\omega)$$

where $V_{a\_ERROR}$ is the armature voltage error signal, $C_1$ is a constant, $G_v$ is a variable gain parameter, and $\omega$ is the actual speed of the motor.

6. A motor control system as claimed in claim 5 wherein said electrical motor includes a characteristic air gap between poles of said field assembly and an armature core of said armature assembly, and wherein said constant $C_1$ includes a motor constant K, unit scaling corrections, and a coefficient for $dI_{f\_SET}/dB$ where $I_{f\_SET}$ is the field current setpoint and B represents the magnetic flux in said air gap of said electrical motor.

7. A motor control system as claimed in claim 1 wherein said armature assembly includes high and low voltage nodes, and wherein said armature voltage sensor is arranged to measure armature voltage at said low voltage node.

8. A motor control system as claimed in claim 1 wherein said electrical motor is driven by a battery voltage characterized by a battery voltage signal, and wherein said microprocessor is further programmed to modify said measured armature voltage signal by summing said measured armature voltage signal and said battery voltage signal prior to comparing said measured armature voltage signal to said armature voltage reference signal.

9. A motor control system as claimed in claim 1 wherein said microprocessor is programmed to generate said armature voltage reference signal, said field current setpoint, and said armature current setpoint from a look-up table.

10. A motor control system as claimed in claim 1 wherein said microprocessor is programmed to generate said armature voltage reference signal, said field current setpoint, and said armature current setpoint from a dual-input look-up table, wherein a first input of said look-up table comprises a torque setpoint signal, and wherein a second input of said look-up table comprises said actual motor speed signal.

11. A motor control system as claimed in claim 10 wherein said microprocessor is programmed to generate said torque setpoint signal as a function of said speed command signal and said actual motor speed signal.

12. A motor control system as claimed in claim 1 wherein said microprocessor is programmed to generate said armature voltage reference signal, said field current setpoint, and said armature current setpoint from a look-up table having at least one input value derived from said speed command signal and said actual motor speed signal.

13. A motor control circuit comprising:
   a motor speed sensor arranged to generate an actual motor speed signal representative of an actual speed of an electrical motor;
   a speed command generator arranged to generate a speed command signal indicative of a desired speed of said electrical motor;
   an armature voltage sensor arranged to generate a measured armature voltage signal corresponding to an armature potential of said electrical motor; and
   a microprocessor programmed to
      generate an armature voltage reference signal, a field current setpoint, and an armature current setpoint, wherein said armature voltage reference signal, said field current setpoint, and said armature current setpoint are generated as a function of said speed command signal and said actual motor speed signal,
      compare said armature voltage reference signal to said measured armature voltage signal and generate an armature voltage error signal based on said comparison, and
      generate a field current correction signal as a function of said armature voltage error signal.

14. A motor control system comprising:
   an electrical motor including
      an armature assembly responsive to an armature current, wherein a magnitude of said armature current is a function of a predetermined armature current setpoint and
      a field assembly responsive to a field current, wherein a magnitude of said field current is a function of a predetermined field current setpoint and
      a field current correction signal;
   a motor speed sensor arranged to generate an actual motor speed signal representative of an actual speed of said electrical motor;
   an armature voltage sensor arranged to generate a measured armature voltage signal from an electrical potential of said armature assembly; and
   a microprocessor programmed to
      generate an armature voltage reference signal, said armature current setpoint and said field current setpoint in response to said actual motor speed signal,
      compare said armature voltage reference signal to said measured armature voltage signal and generate an armature voltage error signal based on said comparison, and
      generate said field current correction signal as a function of said armature voltage error signal.

15. A motor control circuit comprising:
   a motor speed sensor arranged to generate an actual motor speed signal representative of an actual speed of an electrical motor;
   an armature voltage sensor arranged to generate a measured armature voltage signal corresponding to an armature potential of said electrical motor; and
   a microprocessor programmed to
      generate an armature voltage reference signal and a field current setpoint in response to said actual motor speed signal,
      compare said armature voltage reference signal to said measured armature voltage signal and generate an armature voltage error signal based on said comparison, and
      generate a field current correction signal as a function of said armature voltage error signal.

16. A motor control system comprising:
   an electrical motor driven by a battery voltage characterized by a battery voltage signal, said electrical motor including
      an armature assembly including high and low voltage nodes, said armature assembly being responsive to an armature current, wherein a magnitude of said armature current is a function of a predetermined armature current setpoint and
      a field assembly responsive to a field current, wherein a magnitude of said field current is a function of a predetermined field current setpoint and a field current correction signal;
   a motor speed sensor arranged to generate an actual motor speed signal representative of an actual speed of said electrical motor;
   a speed command generator arranged to generate a speed command signal indicative of a desired speed of said electrical motor;
   an armature voltage sensor arranged to generate a measured armature voltage signal from an electrical potential of said armature assembly at said low voltage node; and
   a microprocessor programmed to
      generate an armature voltage reference signal, said field current setpoint, and said armature current setpoint from a dual-input look-up table, wherein a first input of said look-up table comprises a torque setpoint signal, wherein a second input of said look-up table comprises said actual motor speed signal, and wherein said microprocessor is programmed to generate said torque setpoint signal as a function of said speed command signal and said actual motor speed signal,
      compare said armature voltage reference signal to said measured armature voltage signal and generate an armature voltage error signal based on said comparison,
      modify said measured armature voltage signal by summing said measured armature voltage signal and said battery voltage signal prior to
      comparing said measured armature voltage signal to said armature voltage reference signal, and
      generate said field current correction signal $I_{f\_correction}$ according to the following equation:

$$I_{f\_CORRECTION} = V_{a\_ERROR} \times C_1 \times (G_v/\omega)$$

wherein $V_{a\_ERROR}$ is the armature voltage error signal, $C_1$ is a constant, Gv is a variable gain parameter, and ω is the actual speed of the motor, wherein said electrical motor includes a characteristic air gap between poles of said field assembly and an armature core of said armature assembly, and wherein said constant $C_1$ includes a motor constant K, unit scaling corrections, and a coefficient for $dI_{f\_SET}/dB$ where $I_{f\_SET}$ is the field current setpoint and B represents the magnetic flux in said air gap of said electrical motor.

* * * * *